(12) United States Patent
Lehman et al.

(10) Patent No.: US 10,758,074 B1
(45) Date of Patent: Sep. 1, 2020

(54) APPARATUS AND METHOD FOR REMOVING NON-CONDENSABLE GASES FROM A STEAM GENERATOR

(71) Applicants: Lon Lehman, Ft. Wayne, IN (US); Eugene Tippmann, Jr., Ft. Wayne, IN (US)

(72) Inventors: Lon Lehman, Ft. Wayne, IN (US); Eugene Tippmann, Jr., Ft. Wayne, IN (US)

(*) Notice: Subject to any disclaimer, the term of this patent is extended or adjusted under 35 U.S.C. 154(b) by 315 days.

(21) Appl. No.: 15/955,357

(22) Filed: Apr. 17, 2018

Related U.S. Application Data

(60) Provisional application No. 62/486,789, filed on Apr. 18, 2017.

(51) Int. Cl.
*A47J 27/04* (2006.01)
*A23L 5/10* (2016.01)
(Continued)

(52) U.S. Cl.
CPC ............... *A47J 27/04* (2013.01); *A23L 5/13* (2016.08); *A23L 5/17* (2016.08); *A47J 27/002* (2013.01); *A47J 27/0802* (2013.01); *A47J 27/09* (2013.01); *A47J 36/08* (2013.01); *A47J 27/16* (2013.01); *A47J 37/067* (2013.01); *A47J 2027/043* (2013.01); *A47J 2202/00* (2013.01); *A47J 2203/00* (2013.01); *F28D 15/0283* (2013.01)

(58) Field of Classification Search
CPC .... A47J 37/067; A47J 27/04; A47J 2027/043; A47J 27/16–17; A47J 27/0802; A47J 36/08; A23L 5/13; F28D 15/0283; F28D 15/02; B23P 2700/09
See application file for complete search history.

(56) References Cited

U.S. PATENT DOCUMENTS 1,121,470 A    12/1914  Bushnell
1,814,942 A     7/1931  Mabey
(Continued)

FOREIGN PATENT DOCUMENTS

JP    56085691 A  *  7/1981  .......... F28D 15/0283
JP    58088594 A  *  5/1983  .......... F28D 15/0283
(Continued)

OTHER PUBLICATIONS

International Search Report and Written Opinion of the International Searching Authority; PCT/US2009/064388; dated Jun. 28, 2010.

*Primary Examiner* — Matthew P Travers
(74) *Attorney, Agent, or Firm* — Studebaker & Brackett PC

(57) ABSTRACT

An apparatus for removing non-condensable gases from a self-contained or closed loop steam generator is provided. The apparatus is connected to an appliance, which includes the self-contained or closed loop steam generator. The apparatus may be configured to include a control system connected to various portions of the apparatus to provide for automatic removable of non-condensable gases from the steam generator. However, it should be understood that the apparatus can be operated manually. The removal of non-condensable gases occurs prior to generating steam for a cooking process with the apparatus attached directly to the appliance, or with the apparatus configured as a separate unit.

18 Claims, 8 Drawing Sheets

(51) Int. Cl.
  *A47J 27/00* (2006.01)
  *A47J 27/09* (2006.01)
  *A47J 36/08* (2006.01)
  *A47J 27/08* (2006.01)
  *A47J 37/06* (2006.01)
  *F28D 15/02* (2006.01)
  *A47J 27/16* (2006.01)

(56) References Cited

U.S. PATENT DOCUMENTS

| | | |
|---|---|---|
| 2,094,862 A | 10/1937 | Welch |
| 2,552,135 A | 5/1951 | Bertino |
| 3,853,112 A | 12/1974 | Lazaridis et al. |
| 3,948,244 A | 4/1976 | Lazaridis et al. |
| 3,968,787 A | 7/1976 | Basiulis |
| 4,066,862 A | 1/1978 | Tippmann |
| 4,149,840 A | 4/1979 | Tippmann |
| 4,224,864 A | 9/1980 | Wendell |
| 4,245,147 A | 1/1981 | Cummings et al. |
| 4,299,060 A | 11/1981 | Tippmann |
| 4,341,000 A * | 7/1982 | Stockman ............... B23P 15/26 165/104.27 |
| 4,398,651 A | 8/1983 | Kumpfer |
| 4,421,015 A | 12/1983 | Masters |
| 4,547,995 A | 10/1985 | Tippmann |
| 4,604,949 A | 8/1986 | Giese |
| 4,767,581 A | 8/1988 | Tippmann |
| 4,864,788 A | 9/1989 | Tippmann |
| 4,955,361 A | 9/1990 | Sotani et al. |
| 4,970,949 A | 11/1990 | Ferrara, Jr. et al. |
| 5,004,617 A | 4/1991 | Bowen et al. |
| 5,086,693 A | 2/1992 | Tippmann et al. |
| 5,163,356 A | 11/1992 | Chigira |
| 5,201,364 A | 4/1993 | Tippmann et al. |
| 5,203,258 A | 4/1993 | Tippmann et al. |
| 5,235,903 A | 8/1993 | Tippmann |
| 5,245,150 A | 9/1993 | Grandi |
| 5,266,766 A | 11/1993 | Hecox |
| 5,318,792 A | 6/1994 | Tippmann |
| 5,411,753 A | 5/1995 | Tippmann |
| 5,522,310 A | 6/1996 | Black |
| 5,549,040 A | 8/1996 | Naramura |
| 5,552,172 A | 9/1996 | Liebermann |
| 5,584,231 A | 12/1996 | DeLeon |
| 5,639,498 A | 6/1997 | Bakosch |
| 5,655,434 A | 8/1997 | Liebermann |
| 5,662,959 A | 9/1997 | Tippmann |
| 5,680,810 A | 10/1997 | Sham |
| 5,716,657 A | 2/1998 | Liebermann |
| 5,767,487 A | 6/1998 | Tippmann |
| 5,862,747 A | 1/1999 | Handel |
| 5,990,452 A | 6/1999 | Shelton |
| 5,921,172 A | 7/1999 | Kiczko et al. |
| 5,939,125 A | 8/1999 | Tippmann et al. |
| 5,960,869 A | 10/1999 | Tippmann et al. |
| 5,980,966 A | 11/1999 | Handel |
| 5,993,878 A | 11/1999 | Tippmann |
| 6,062,129 A | 5/2000 | Tippmann et al. |
| 6,103,289 A | 8/2000 | Tippmann et al. |
| 6,145,431 A | 11/2000 | Tippmann et al. |
| 6,152,024 A | 11/2000 | Tippmann |
| 6,263,963 B1 | 7/2001 | Tippmann et al. |
| 6,498,329 B1 | 12/2002 | Gibernau |
| 6,539,839 B1 | 4/2003 | Tippmann |
| 6,639,187 B2 | 10/2003 | Arel et al. |
| 6,751,977 B2 | 6/2004 | Sands et al. |
| 6,753,025 B1 | 6/2004 | Tippmann |
| 7,063,232 B2 | 6/2006 | Chirnomas |
| 7,217,906 B2 | 5/2007 | Veltrop |
| 7,348,519 B2 | 3/2008 | Federspiel et al. |
| 7,530,473 B2 | 5/2009 | Chirnomas |
| 7,538,300 B1 | 5/2009 | Tippmann, Jr. et al. |
| 7,677,160 B2 | 3/2010 | Tippmann, Sr. et al. |
| 8,367,977 B2 | 2/2013 | Lehman |
| 8,822,886 B2 | 9/2014 | Lehman et al. |
| 2001/0002674 A1 | 6/2001 | Gubbini et al. |
| 2005/0109218 A1 | 5/2005 | Amedo et al. |
| 2005/0204927 A1 | 9/2005 | Boyle et al. |
| 2006/0137541 A1 | 6/2006 | Tippmann et al. |
| 2006/0186133 A1 | 8/2006 | Chirnomas |
| 2007/0062036 A1 * | 3/2007 | Tung ................. H01L 21/4882 29/890.032 |
| 2009/0071345 A1 * | 3/2009 | Wolf .................... A47J 37/067 99/330 |

FOREIGN PATENT DOCUMENTS

| | | | |
|---|---|---|---|
| JP | 58099689 A * | 6/1983 | ......... F28D 15/0283 |
| JP | H07-289444 A | 11/1995 | |
| JP | 2004-209161 A | 7/2004 | |
| KR | 10-0364682 | 12/2002 | |
| KR | 10-2010-0111650 | 10/2010 | |

* cited by examiner

APPARATUS AND METHOD FOR REMOVING NON-CONDENSABLE GASES FROM A STEAM GENERATOR

TECHNICAL FIELD

This disclosure relates to appliances that include a steam generator.

BACKGROUND

Self-contained or closed loop appliances using steam heat for commercial cooking are known. Though such appliances can be nominally self-contained or closed loop, the intrusion of non-condensable gases, such as nitrogen and oxygen, can inhibit the transfer of heat by steam to a cooking surface, causing undesirable "cold spots" or "uneven" temperature zones. Such intrusion of non-condensable gases can occur during the manufacturing process or in use in the field.

SUMMARY

This disclosure provides a steam cooker comprising a reservoir, an outlet valve, a fluid circuit, an inlet valve, and a fluid-filled chamber. The reservoir has a predetermined fluid level. The outlet valve is connected to the reservoir. The inlet valve connected to the reservoir by the fluid circuit. The fluid-filled chamber is connected to the reservoir by the fluid circuit. The fluid-filled chamber operable to increase a volume of fluid in the reservoir when each of the inlet valve and the outlet valve are open to entirely fill the reservoir, and after the outlet valve is closed the fluid-filled chamber is operable to decrease the volume of fluid in the reservoir to the predetermined fluid level to form a vacuum in part of the reservoir.

This disclosure also provides a steam cooker comprising a reservoir, an outlet valve, a fluid circuit, an inlet valve, a fluid filled chamber, and a bi-directional fluid transfer device. The reservoir has a predetermined fluid level. The outlet valve is connected to the reservoir. The inlet valve is connected to the reservoir by the fluid circuit. The fluid filled chamber is connected to the fluid circuit upstream of the inlet valve. The bi-directional fluid transfer device is operable to transfer fluid to the reservoir from the fluid filled chamber when each of the inlet valve and the outlet valve are open to entirely fill the reservoir, and after the outlet valve is closed the bi-directional fluid transfer device is operable to decrease the volume of fluid in the reservoir to the predetermined fluid level, which forms a vacuum in part of the reservoir.

Advantages and features of the embodiments of this disclosure will become more apparent from the following detailed description of exemplary embodiments when viewed in conjunction with the accompanying drawings.

DETAILED DESCRIPTION

Figure 1:
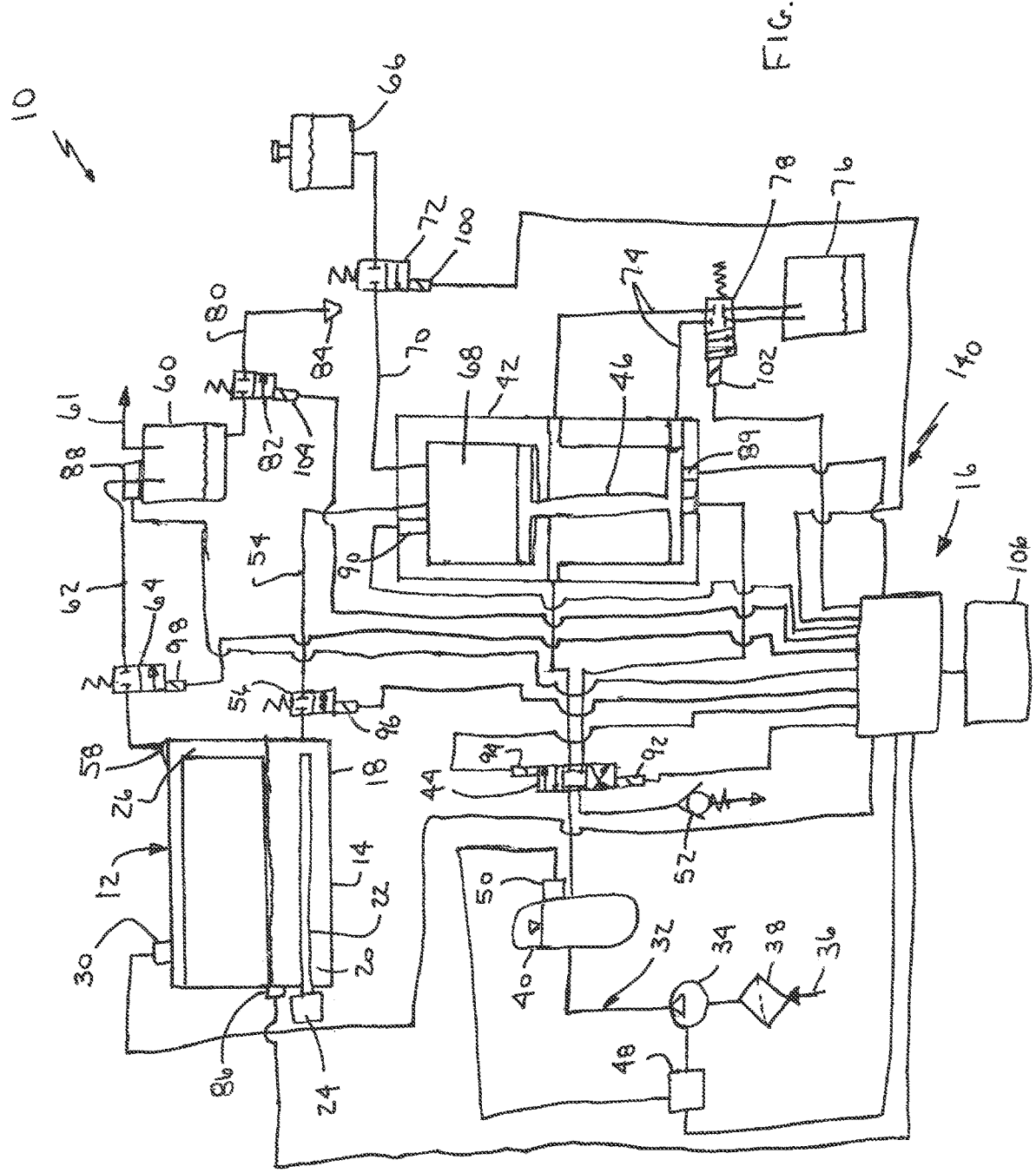
FIG. 1 shows a stylized schematic view of an apparatus for removing non-condensable gases from a closed loop steam generator in accordance with an exemplary embodiment of the present disclosure.
Figure 2:
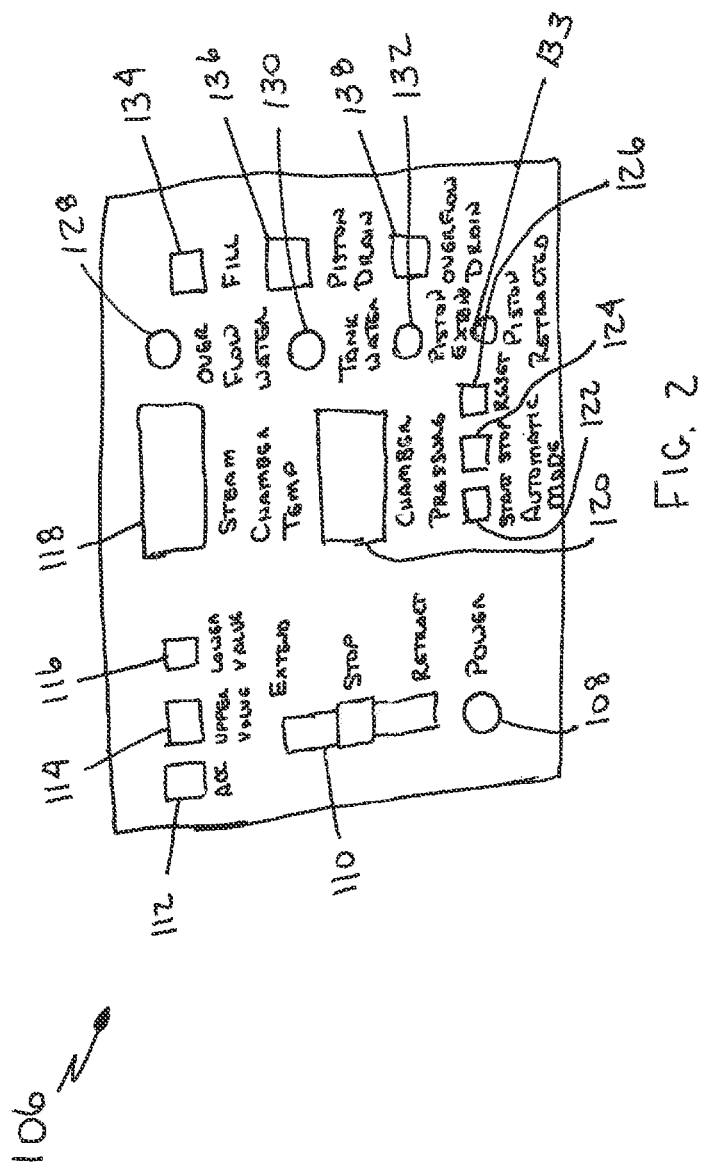
FIG. 2 shows a control panel of the apparatus of FIG. 1 in accordance with an exemplary embodiment of the present disclosure.

Referring to FIG. 1, a stylized schematic view of an apparatus for removing non-condensable gases from a self-contained or closed loop steam generator in accordance with an exemplary embodiment of the present disclosure is shown, indicated generally at 10. Apparatus 10 is connected to a steam cooking appliance 12, which includes a self-contained or closed loop steam generator 14. In the exemplary embodiment of FIG. 1, apparatus 10 includes a control system 16 connected to various portions of apparatus 10 to provide for manual or automatic removable of non-condensable gases from self-contained or closed loop steam generator 14, which occurs prior to generating steam for a cooking process. Apparatus 10 can be attached directly to appliance 12, or apparatus 10 can be configured as a separate unit.

In addition to self-contained or closed loop steam generator 14, appliance 12 includes a reservoir 18 that is configured to contain a fluid 20, which in an exemplary embodiment is water. However, it should be understood that fluids other than water can be used. In exemplary embodiments, other fluids that can be used include glycerol, propylene glycol, and ethylene glycol, typically mixed with water. It should also be understood that when other fluids are used, the term "steam" can include a gaseous form of a liquid other than water.

Appliance 12 further includes a heating element, which in an exemplary embodiment can be a submersed heating element 22 powered by a power supply or controller 24. When power supply or controller 24 is operated, power is provided to submersed heating element 22, which converts fluid 20 to a steam 26. Since reservoir 18 is self-contained and sealed, pressure is allowed to build in reservoir 18, causing steam 26 to become superheated. Appliance 12 also includes, as can be seen in, for example FIGS. 7 and 8, one or more cooking surfaces 28 positioned near, along, alongside, or adjacent to liquid/steam reservoir 18, in thermal communication with reservoir 18. Accordingly, heat from superheated steam 26 is transferred to cooking surface(s) 28, which is then able to heat food to temperatures greater than 350 degrees Fahrenheit. Appliance 12 is further configured to include a combination sensor 30 that provides signals indicating temperature and pressure of an upper part of reservoir 18.

Portions of steam cooker 10 can include pneumatically operated device, hydraulically operated devices, and/or electrically operated devices. For example, steam cooker 10 can include a fluid circuit 32, which in the exemplary embodiment of FIG. 1 is a pneumatic or air handling circuit, along which is positioned a plurality of devices. The plurality of devices can include an air pump 34, an inlet 36 from atmosphere connected to air pump 34 through a filter 38, an accumulator 40 positioned to receive fluid flow from air pump 34, a bi-directional cylinder 42, and a three-way valve 44 positioned along fluid circuit 32 at a location that is between accumulator or reservoir 40 and bi-directional cylinder 42. Bi-directional cylinder 42 includes a piston 46.

Apparatus 10 can also include a drive motor 48 drivingly connected to pump 34 to drive pump 34, and a pressure switch 50 configured to close when reservoir 40 is at a predetermined pressure level. Three-way valve 44 can also include a connection to a check valve 52.

Bi-directional cylinder 42 is fluidly connected to reservoir 18 of appliance 12 by way of a fluid circuit 54. Fluid circuit 54 connects to reservoir 18 at a location that is below a desired predetermined fluid level in reservoir 18, the predetermined fluid level being a preferred fluid level for generation of steam for appliance 12. The connection of fluid circuit 54 below the preferred fluid level is desirable because it reduces air entrainment in the fluid as the fluid flows from fluid circuit 54 into reservoir 18. Positioned along fluid circuit 54 is a valve 56.

Positioned near a top of appliance 12 is an outlet 58 that is fluidly connected to an overflow reservoir 60 by way of a fluid overflow circuit 62. A valve 64 is positioned along fluid overflow circuit 62 to provide a connection between reservoir 18 and overflow reservoir 60.

System 10 can include a plurality of support elements. For example, an input reservoir 66 can be connected to an internal chamber 68 of cylinder 42 by way of a fill circuit 70. A fill valve 72 can be positioned along fill circuit 70 to control fluid flow from input reservoir 66 to chamber 68. Cylinder 42 can include a drain circuit 74 connected to a drain reservoir 76. A drain valve 78 can be positioned along drain circuit 74 to control flow from cylinder 42 to drain reservoir 76. An overflow drain circuit 80 can be connected to overflow reservoir 60 and controlled by an overflow drain valve 82 positioned along overflow drain circuit 80. Overflow drain circuit 80 be emptied into, for example, a bucket 84 or other receptacle 84 for disposal.

Control system 16 can include a plurality of sensors. For example, temperature/pressure sensor 30 is connected to control system 16. A fluid level sensor 86 connected to control system 16 can be positioned to determine a fluid level in reservoir 18. A fluid flow sensor 88 can be positioned on overflow reservoir 60 to detect when fluid flows from reservoir 18 into overflow reservoir 60. Bi-directional cylinder 42 can include proximity or other sensors 89 and 90 to indicate when piston 46 is in the position shown in FIG. 1 or in the position shown in FIG. 3, respectively, which represent limits of travel of piston 46.

Control system 16 can also be electrically connected to a plurality of valve actuators. For example, control system 16 can operate valves 44, 56, 64, 72, 78, and 82 by way of actuators 92-104.

Control system 16 can further include an operator or user control panel 106. Control panel 106 can include a power button or control 108, a piston control 110 for operating bi-directional cylinder 42, buttons or controls 112, 114, and 116 for operating drive motor 48, valve 64 and valve 56, respectively, displays 118 and 120 for displaying the temperature and pressure of steam 26 in reservoir 18. Additional buttons/controls 122, 124, and 126 can provide control of automatic operation of system 10, including start, stop, and reset functions, respectively. For example, with a single press of start button 122, i.e., a single input to control system 16, the non-condensable removal function of apparatus 10, including fluid flow to and from reservoir 18, establishing the predetermined fluid level in reservoir 18, and opening and closing of a plurality of valves, can be performed without further operator or user input. Indicators, such as lights, 128, 130, 132, and 133 can provide indications that fluid is flowing into overflow reservoir 60, low fluid level in reservoir 18, piston extended for pressurizing reservoir 18, and piston retracted to generate a vacuum pressure in reservoir 18. Additional buttons/controls 134, 136, and 138 can operate valve 72 to add fluid to internal chamber 68, can operate valve 78 to drain fluid from internal chambers of bi-directional cylinder 42, and can operate valve 82 to empty overflow reservoir 60.

Many aspects of the disclosure are described in terms of sequences of actions to be performed by elements of a computer system or other hardware capable of executing programmed instructions, for example, a general purpose computer, special purpose computer, workstation, or other programmable data processing apparatus. It will be recognized that in each of the embodiments including active or electronic elements, the various actions could be performed by specialized circuits (e.g., discrete logic gates interconnected to perform a specialized function), by program instructions (software), such as logical blocks, program modules etc. being executed by one or more processors (e.g., one or more microprocessors, a central processing unit (CPU), and/or application specific integrated circuit), or by a combination of both. For example, embodiments can be implemented in hardware, software, firmware, middleware, microcode, or any combination thereof. The instructions can be program code or code segments that perform necessary tasks and can be stored in a non-transitory, machine-readable medium such as a storage medium or other storage(s). A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents.

The non-transitory machine-readable medium can additionally be considered to be embodied within any tangible form of computer readable carrier, such as solid-state memory, magnetic disk, and optical disk containing an appropriate set of computer instructions, such as program modules, and data structures that would cause a processor to carry out the techniques described herein. A computer-readable medium may include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (e.g., EPROM, EEPROM, or Flash memory), or any other tangible medium capable of storing information.

It should be noted that the systems of the present disclosure are illustrated and discussed herein as having various modules and units which perform particular functions. It should be understood that these modules and units are merely schematically illustrated based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Input/output or I/O devices or user interfaces including but not limited to keyboards, displays, pointing devices, and the like can be coupled to the system either directly or through intervening I/O controllers. Thus, the various aspects of the disclosure may be embodied in many different forms, and all such forms are contemplated to be within the scope of the disclosure.

Control system 16 is configured to include a CPU, processor, or controller, a non-transitory memory configured to contain instructions to operate one or more elements of apparatus 10, a display, an input, and may include one or more power supplies, amplifiers, wireless transceiver, receiver, and/or transmitter (not shown). Control system 16 is configured to include a wiring system 74 that permits signals to be transmitted by control system 16 to various elements of apparatus 10, and that permits signals to be transmitted by various elements of apparatus 10 to control system 16.

As discussed briefly hereinabove, the function of the portions of apparatus 10 related to removal of non-condensable gases is to remove as much of those gases from reservoir 18 as possible prior to operation of steam cooker, appliance, or apparatus 12. As will be described in more detail hereinbelow, to remove non-condensable gases, piston 46 is moved from the position shown in FIG. 1 to the position shown in FIG. 3. As piston 46 moves from the position shown in FIG. 1 to the position shown in FIG. 3, fluid in internal chamber 68 is forced through fluid circuit 54 into reservoir 18. The amount of fluid in internal chamber 68 is sufficient to fill reservoir 18 entirely. Fluid then flows from reservoir 18 by way of outlet 58 into fluid overflow circuit 62 by way of valve 64. Fluid flowing from fluid overflow circuit 62 through flow sensor 88 is detected by control system 16, which then closes valve 64. Piston 46 is then moved from the position shown in FIG. 3 to the position shown in FIG. 1. Since valve 64 is closed, air is unable to flow into reservoir 18 as piston 46 is moved to permit fluid to flow from reservoir 18 into internal chamber 68. Accordingly, an upper location of reservoir 18 is emptied of fluid with movement of piston 46, forming a low pressure or vacuum at the upper location of reservoir 18. One piston 46 ceases movement, valve 56 is closed to maintain the vacuum pressure condition in reservoir 18, thus minimizing the amount of non-condensable gases in reservoir 18.

More specifically, control system 16 provides power to drive motor 48, which operates pump 34. Pump 34 pulls air through inlet 36 and air filter 38. Pump 34 then provides pressurized air to accumulator 40. Though not shown, a check valve can be positioned integral to accumulator 40 or at a location between pump 34 and accumulator 40 to prevent air from flowing from accumulator 40 to pump 34 when pump 34 is not operating. Once accumulator 40 is full, as indicated by signals from pressure switch 50 to control system 16, drive motor 48 is turned off, which stops pumping from pump 34.

Figure 3:
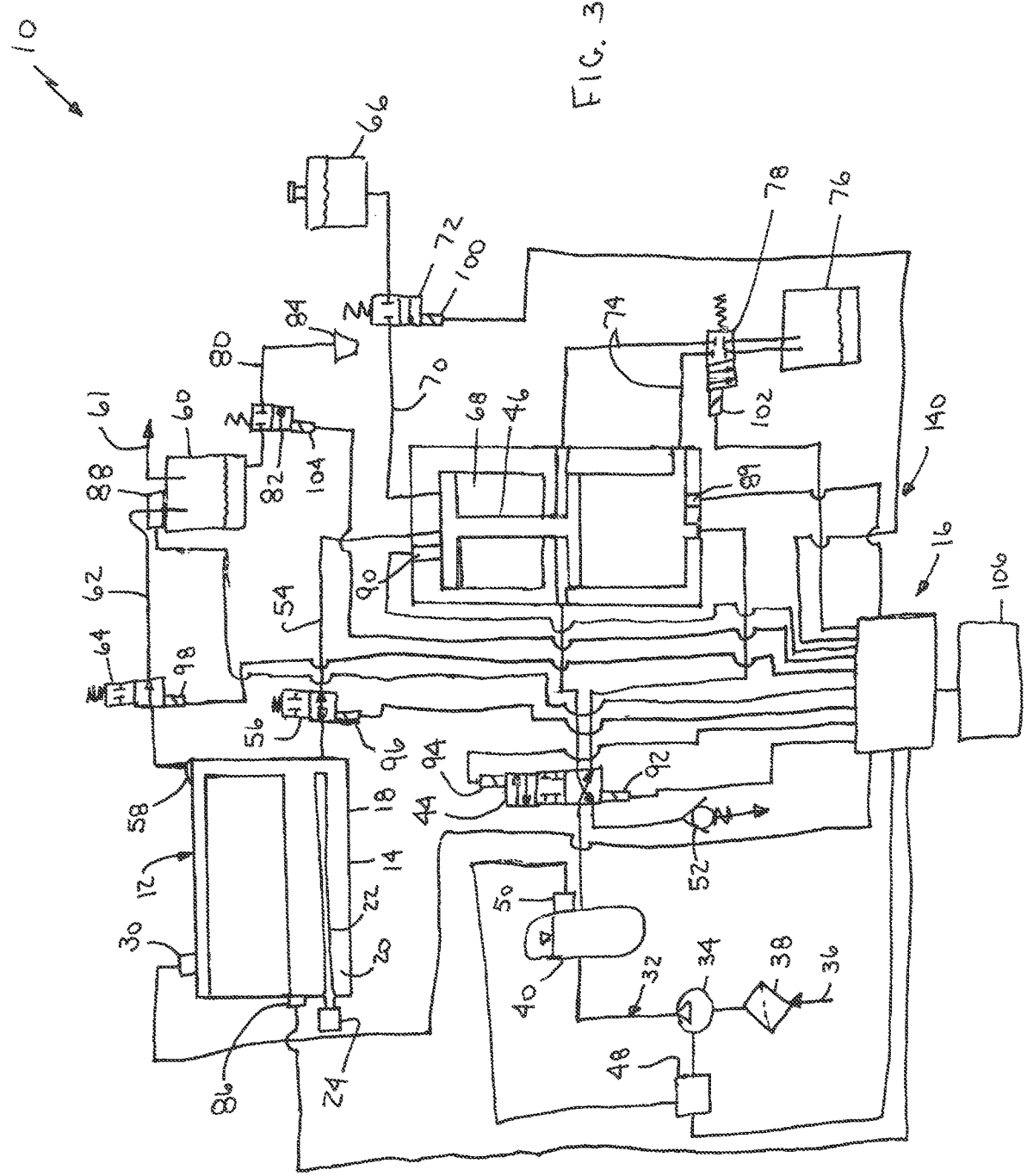
FIG. 3 shows a further view of the apparatus of FIG. 1.
Figure 4:
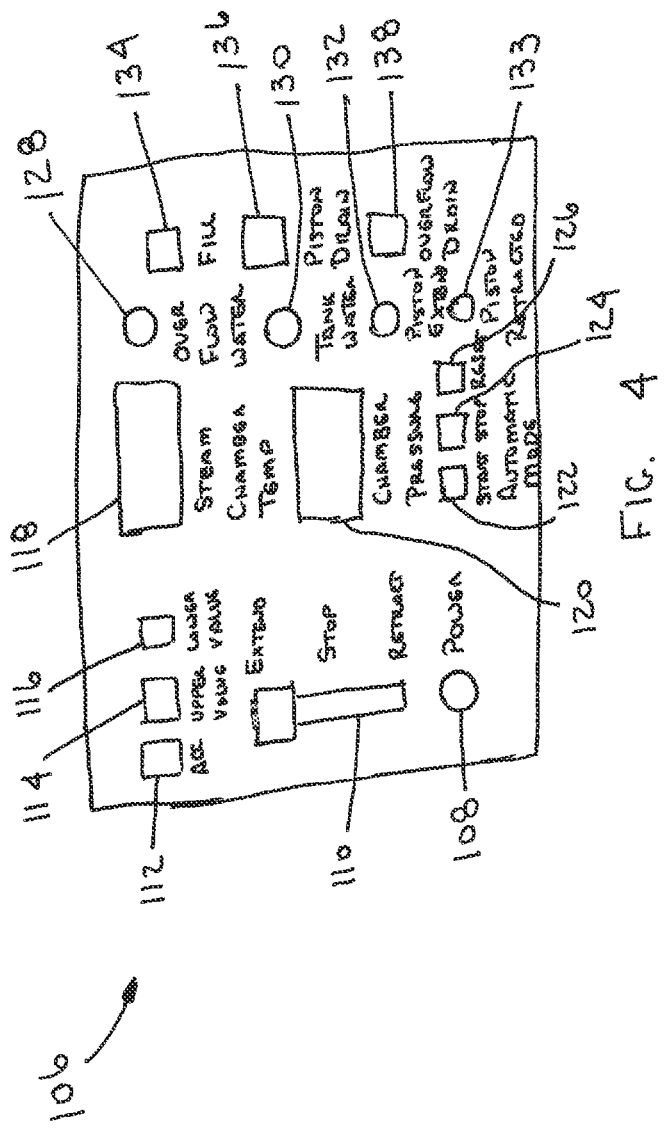
FIG. 4 shows a further view of the control panel of FIG. 2.

Air stored in accumulator 40 provides the force necessary to move piston 46 between the positions shown in FIGS. 1 and 3, as controlled by valve 44. Thus, when valve 44 is in the position shown in FIG. 3, which is operated by piston control 110 of control panel 106 as shown in FIG. 4, piston 46 is forced to move from the position shown in FIG. 1 to the position shown in FIG. 3. Valve 44 can then be returned to the position shown in FIG. 1, or valve 44 can be moved to the position shown in FIG. 5, which provides air pressure to bi-directional cylinder 42 to drive piston 46 from the position shown in FIG. 5 to the position shown in FIG. 1.

Before piston 46 can be moved, control system 16 receives signals and operates various valves. More specifically, when piston 46 is in the position shown in FIG. 1, control system 16 determines whether the amount or volume of fluid in reservoir 18 is within a predetermined range as determined by fluid level sensor 86. If the amount of fluid is too high, the excess fluid will be eliminated by way of fluid overflow circuit 62 when piston 46 operates to push fluid into reservoir 18. On the other hand, if the amount of fluid is too low, control system 16 can operate actuator 96 to connect chamber 68 to reservoir 18, actuator 98 to connector reservoir 18 to overflow reservoir 60, and actuator 100 to connect fluid from input reservoir 66 to internal chamber 68, permitting fluid to flow into chamber 68 and then into reservoir 18 until fluid level sensor 86 indicates that a desired fluid level is reached. Though input reservoir 66 is shown lower than reservoir 18, input reservoir will be positioned at least higher than fluid level sensor 86 to permit fluid to flow under the force of gravity from input reservoir 66 into chamber 68 and reservoir 18. Alternatively, input reservoir 66 can be pressurized. Fluid is able to flow into reservoir 18 because air is displaced through overflow reservoir 60 by way of an overflow vent 61 that vents to atmosphere. Once the fluid level is at a desired level, as determined by fluid level sensor 86, actuator 100 is deactivated, permitting normal closed valve 72 to return to a closed state, stopping further flow of fluid from input reservoir 66 into chamber 68 and reservoir 18.

In a case where fluid is at an appropriate level or volume in reservoir 18, valves 56 and 64 are opened by control system prior to operation of bi-directional cylinder 42. After valves 56 and 64 are opened, actuator 92 is operated by control system 16 to move valve 44 to the position shown in FIG. 3. Air flows into bi-directional cylinder 42, moving piston 46 from the position shown in FIG. 1 to the position shown in FIG. 3, forcing fluid from chamber 68 into reservoir 18. Fluid fills reservoir 18 entirely, then through outlet 58 into fluid overflow circuit 62, through valve 64, past flow sensor 88, and into overflow reservoir 60. Once control system 16 detects fluid flow at flow sensor 88, control system 16 knows that no air remains in reservoir 18. Control system 16 then moves valve 44 from the position shown in FIG. 3 to the position shown in FIG. 1 to stop any further movement of piston 46. Next control system 16 stops actuating actuator 98, permitting normal closed valve 64 to return to a closed position to prevent air flow back into reservoir 18 when piston 46 is returned to its original position.

Figure 5:
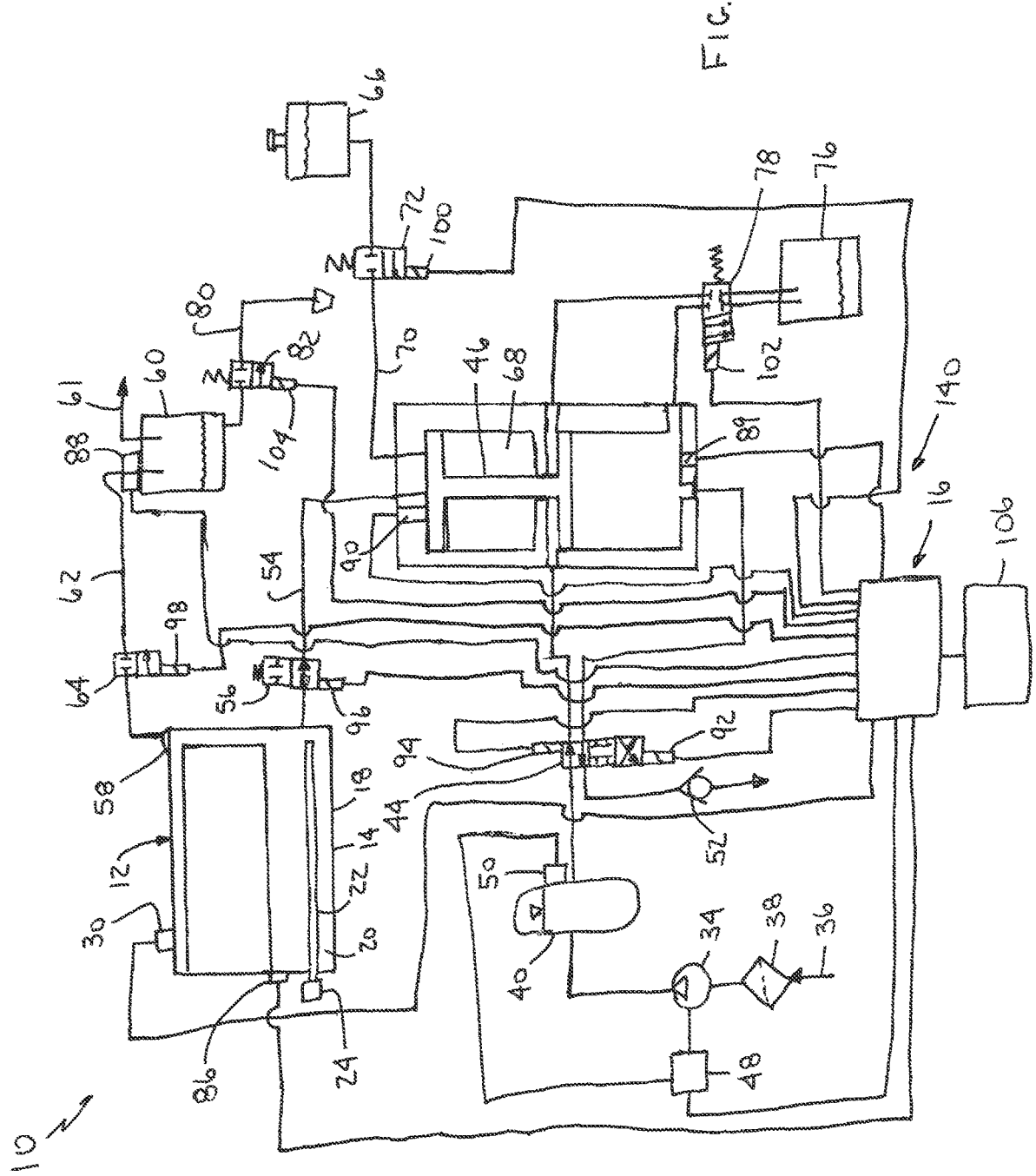
FIG. 5 shows a further view of the apparatus of FIG. 1.
Figure 6:
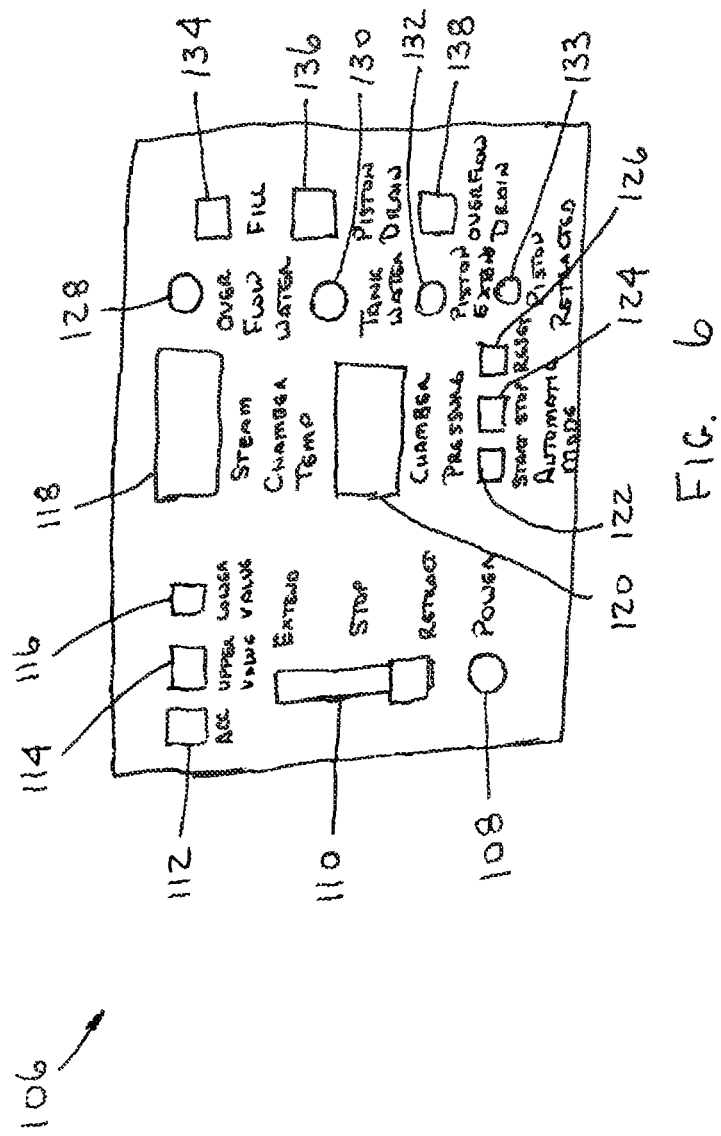
FIG. 6 shows a further view of the control panel of FIG. 2.

Control system 16 now operates actuator 94 to move valve 44 to the position shown in FIG. 5. With valve 44 in the position shown in FIG. 5, which can be actuated by piston control 110 in the position shown in FIG. 6, piston 46 will be driven from the position shown in FIG. 5 to the position shown in FIG. 1, which causes fluid to flow from reservoir 18 to chamber 68. Since air is unable to enter reservoir 18, upper parts of reservoir 18 form a vacuum as fluid is evacuated from reservoir 18 into bi-directional cylinder chamber 68. Since bi-directional cylinder 42 and piston 46 are operable to provide fluid flow to and from reservoir 18, it should be apparent that bi-directional cylinder 42 and piston 46 can be described as a bi-directional fluid transfer device, apparatus, or system. Once piston 46 is retracted, or returned to the position shown in FIG. 1, control system 16 removes a control signal from actuator 96, permitting normal closed valve 56 to return to a closed position, which maintains the vacuum condition in reservoir 18.

The fluid in reservoir 18 can have entrained air. Accordingly, the process to form a vacuum pressure in reservoir 18 can cause air to de-aerate from the fluid in reservoir 18. Sensor 30 includes a pressure sensor, which can indicate when pressure in reservoir 18 after formation of a vacuum is higher than expected, which can be due to a failure of the system, such as through a leak, or because of air de-aerated from fluid in reservoir 18. Regardless of the source, the system of the present disclosure can be operated multiple times to remove air from the de-aeration of fluid, also called de-gassing, until the amount of air from the reservoir fluid is negligible, which can be indicated by a very low pressure in reservoir 18, or a non-measurable air pressure in reservoir 18 after cycling piston 46 as described above.

To minimize the level of training for operation of system 10, control system 16 can include self-maintenance features. One such example is the ability to automatically fill reservoir 18, as described hereinabove. Another example is the ability to operate actuator 104 to drain overflow reservoir 60, which can be done on a periodic basis. Further, control system 16 can operate actuator 102 to automatically drain any fluid that accumulates in portions of bi-directional cylinder 42, if any. Of course, fluid should not leak into areas of cylinder 42 away from chamber 68, but until bi-directional cylinder 42 can be repaired, any leakage can be drained in the interim.

Control panel 106 can provide indications that various portions of system 10 are operating. In addition, control panel 106 can operate various portions of system 10, either automatically or manually, as described hereinabove.

Figure 7:
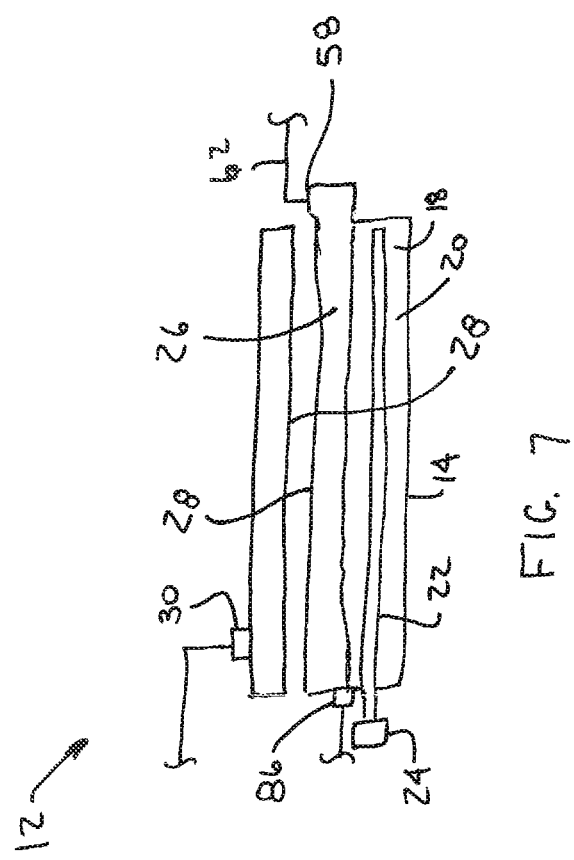
FIG. 7 shows a stylized view of a steam cooking apparatus of FIG. 1 in accordance with an exemplary embodiment of the present disclosure.
Figure 8:
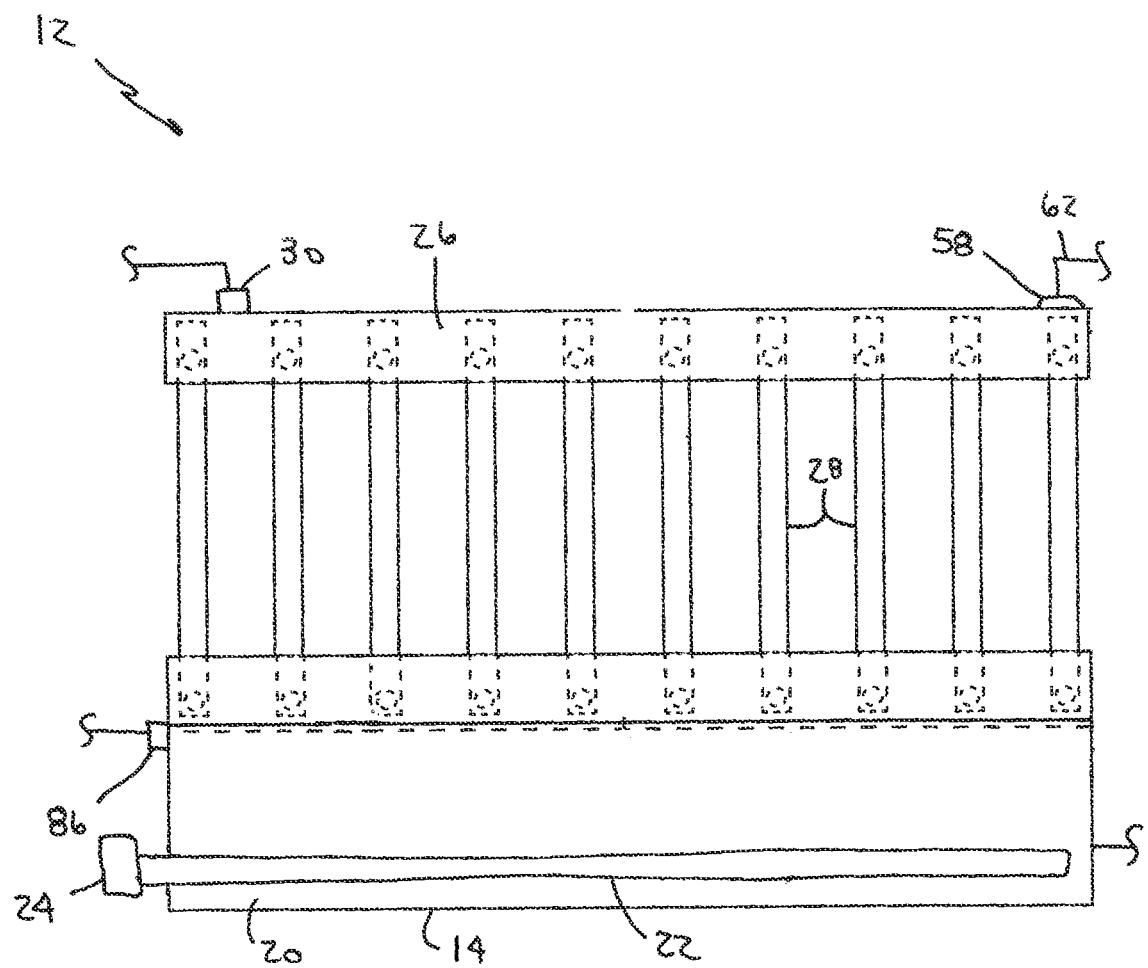
FIG. 8 shows a stylized view of another steam cooking apparatus of FIG. 1 in accordance with another exemplary embodiment of the present disclosure.

FIGS. 7 and 8 show two exemplary steam cooking appliances 12. Steam cooking appliance 12 shown in FIG. 7 is a horizontal-type steam cooker, also called a clamshell steam cooker.

While various embodiments of the disclosure have been shown and described, it is understood that these embodiments are not limited thereto. The embodiments may be changed, modified, and further applied by those skilled in the art. Therefore, these embodiments are not limited to the detail shown and described previously, but also include all such changes and modifications.

We claim:

1. A steam cooker, comprising:
    a reservoir having a predetermined fluid level;
    an outlet valve connected to the reservoir;
    a fluid circuit;
    an inlet valve connected to the reservoir by the fluid circuit; and
    a fluid-filled chamber connected to the reservoir by the fluid circuit, the fluid-filled chamber operable to increase a volume of fluid in the reservoir when each of the inlet valve and the outlet valve are open to entirely fill the reservoir, and after the outlet valve is closed the fluid-filled chamber is operable to decrease the volume of the fluid in the reservoir to the predetermined fluid level to form a vacuum in part of the reservoir.

2. The steam cooker of claim 1, including a bi-directional piston positioned to move the fluid in the fluid-filled chamber to the reservoir by way of the fluid circuit when the bi-directional piston moves in a first direction, and positioned to move the fluid from the reservoir to the fluid-filled chamber by way of the fluid circuit when the bi-directional piston moves in a second direction that is opposite to the first direction.

3. The steam cooker of claim 2, wherein one or more sensors determine when the bi-directional piston is at a limit of travel.

4. The steam cooker of claim 1, including a sensor to determine a fluid level in the reservoir.

5. The steam cooker of claim 4, including an input reservoir, and when the fluid level is lower than the predetermined fluid level the input reservoir is automatically connected by a fill circuit to the reservoir to increase the fluid level.

6. The steam cooker of claim 5, wherein the fill circuit is connected to the fluid circuit.

7. The steam cooker of claim 6, wherein the fill circuit is connected to the fluid circuit by way of the fluid-filled chamber.

8. The steam cooker of claim 1, including a control system and at least one sensor, the control system operable to determine the predetermined fluid level, to cause fluid to flow from the fluid-filled chamber to the reservoir, and to cause fluid to flow from the reservoir to the fluid-filled chamber to the predetermined fluid level automatically with only a single input.

9. The steam cooker of claim 1, wherein the outlet valve is positioned along an overflow circuit, and when fluid flow is detected in the overflow circuit, fluid flow from the fluid-filled chamber to the reservoir is stopped and the outlet valve is closed.

10. The steam cooker of claim 9, wherein fluid flow in the overflow circuit is detected by a flow sensor.

11. A steam cooker, comprising:
    a reservoir having a predetermined fluid level;
    an outlet valve connected to the reservoir;
    a fluid circuit;
    an inlet valve connected to the reservoir by the fluid circuit;
    a fluid filled chamber connected to the fluid circuit upstream of the inlet valve; and
    a bi-directional cylinder operable to transfer fluid to the reservoir from the fluid filled chamber when each of the inlet valve and the outlet valve are open to entirely fill the reservoir, and after the outlet valve is closed the bi-directional cylinder is operable to decrease the volume of the fluid in the reservoir to the predetermined fluid level, which forms a vacuum in part of the reservoir.

12. The steam cooker of claim 11, wherein the bi-directional cylinder includes a bi-directional piston.

13. The steam cooker of claim 12, wherein one or more sensors determine when the bi-directional piston is at a limit of travel.

14. The steam cooker of claim 11, including a sensor to determine a fluid level in the reservoir.

15. The steam cooker of claim 14, including an input reservoir, and when the fluid level is lower than the predetermined fluid level the input reservoir is automatically connected by a fill circuit to the reservoir to increase the fluid level.

16. The steam cooker of claim 15, wherein the fill circuit is connected to the fluid circuit.

17. The steam cooker of claim 16, wherein the fill circuit is connected to the fluid circuit by way of the fluid-filled chamber.

18. The steam cooker of claim 11, wherein the outlet valve is positioned along an overflow circuit, and when fluid flow is detected in the overflow circuit, fluid flow from the fluid-filled chamber to the reservoir is stopped and the outlet valve is closed.

* * * * *